US012070428B1

(12) United States Patent
Yearsley et al.

(10) Patent No.: US 12,070,428 B1
(45) Date of Patent: *Aug. 27, 2024

(54) DEFLATING RECTANGULAR BAG WITH RELEASE VALVE, AND METHOD FOR USE TO LOWER A CASKET INTO A FRONT- OR SIDE-FACING SUBTERRANEAN CRYPT

(71) Applicant: Ensure-A-Seal, Inc., Export, PA (US)

(72) Inventors: David A. Yearsley, Export, PA (US); Marc R. Yearsley, Philadelphia, PA (US)

(73) Assignee: ENSURE-A-SEAL, INC., Export, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/666,710

(22) Filed: Feb. 8, 2022

Related U.S. Application Data

(63) Continuation of application No. 16/985,281, filed on Aug. 5, 2020, now Pat. No. 11,273,093.

(60) Provisional application No. 62/883,169, filed on Aug. 6, 2019.

(51) Int. Cl.
*A61G 19/00* (2006.01)
*E04H 13/00* (2006.01)

(52) U.S. Cl.
CPC ........... *A61G 19/00* (2013.01); *E04H 13/006* (2013.01)

(58) Field of Classification Search
CPC .... A61G 19/00; A61G 17/044; E04H 13/006; A47C 27/08; A47C 27/084; A47C 27/088; A47C 27/18; A45C 27/084; A45C 27/088; A45C 27/18
USPC .................................................. 27/12, 32–34
See application file for complete search history.

(56) References Cited

U.S. PATENT DOCUMENTS

| | | | | |
|---|---|---|---|---|
| 10,139 | A | 10/1853 | Scott | |
| 388,037 | A | 8/1888 | Hargin | |
| 2,008,444 | A | 7/1935 | Goodsman | |
| 2,859,505 | A | 11/1958 | Jarvis | |
| 3,303,518 | A | 2/1967 | Ingram | |
| 4,050,125 | A * | 9/1977 | Malbon | A61G 17/0136 27/2 |
| 4,643,398 | A | 2/1987 | Vetter | |
| 5,068,933 | A | 12/1991 | Sexton | |
| 5,201,102 | A | 4/1993 | McClure | |
| D341,012 | S | 11/1993 | Baird | |
| 5,329,656 | A | 7/1994 | Leggett | |
| 5,606,785 | A | 3/1997 | Shelberg et al. | |
| 8,240,013 | B2 * | 8/2012 | Williamson | A61G 17/0136 27/14 |
| 8,628,060 | B2 | 1/2014 | Bonus | |
| 9,056,691 | B2 | 6/2015 | Mills et al. | |
| 11,324,336 | B1 * | 5/2022 | Chen | A47C 27/087 |
| 2002/0138911 | A1 * | 10/2002 | Giori | A47C 27/084 5/709 |

(Continued)

*Primary Examiner* — William L Miller
(74) *Attorney, Agent, or Firm* — Reed Smith LLP

(57) ABSTRACT

A lightweight deflating rectangular bag made of a leak and puncture resistant mattress film with a plastic two-way valve for lowering of caskets for entombment in below-floor level "Westminster" crypt locations. The deflating bag is configured to lower a casket, in a safe, dignified, and simple manner, into a subterranean crypt for final entombment, while family members, relatives, and friends observe during this important moment in the funeral service.

18 Claims, 8 Drawing Sheets

(56) References Cited

U.S. PATENT DOCUMENTS

| | | | | |
|---|---|---|---|---|
| 2006/0070184 | A1* | 4/2006 | Lin | A47C 27/084 5/689 |
| 2010/0218350 | A1 | 9/2010 | De La Fuente et al. | |
| 2012/0276798 | A1* | 11/2012 | Chai | B32B 27/40 442/394 |
| 2013/0042414 | A1* | 2/2013 | Schreiber | A61G 7/05 5/714 |
| 2017/0042338 | A1* | 2/2017 | Yang | A47C 27/088 |
| 2018/0325277 | A1* | 11/2018 | Perera | A47C 27/10 |

* cited by examiner

DEFLATING RECTANGULAR BAG WITH RELEASE VALVE, AND METHOD FOR USE TO LOWER A CASKET INTO A FRONT- OR SIDE-FACING SUBTERRANEAN CRYPT

CROSS-REFERENCE TO RELATED APPLICATION

This application is a continuation application which claims priority to U.S. patent application Ser. No. 16/985,281 filed on Aug. 8, 2020, which claims the benefit of the earlier filing date of United States Provisional Patent Application No. 62/883,169 filed on Aug. 6, 2019, the disclosure of which is incorporated by reference herein.

FIELD

Exemplary embodiments of the disclosure relate to the field of mortuary science, caskets and lowering apparatus, and in particular an apparatus and method for use in connection with lowering caskets during a funeral service for entombment in front- or side-facing subterranean mausoleum crypts.

BACKGROUND

Two devices and methods of lowering caskets into front-facing subterranean crypts are known. Each method relies on both significant lifting manpower and persons entering the confined space of the crypt. The second method further uses non-standardized materials and methods. The first is a mechanical device that is a track and roller mechanical assembly consisting of two rear posts, a front frame, a top frame with track, and a top frame with rollers and straps that rests on top of the casket. Once assembled two handles on the top frame lower the casket into the subterranean crypt chamber. This device is designed only for front-facing subterranean crypts. See FIGS. 12A-12C.

The second method involves placing one or two pieces of 2"×4" or 2"×6" lumber, metal, or other material at an angle resting on the front lip of the crypt and extending halfway into the floor of the crypt. The casket is then placed on top of the boards and slid down into the crypt. Then two people hold onto the front handle of the casket, either with their hands or to a rope or other straps tied to the handle, and lift the casket in the air. One person then removes the lumber that was used to support the casket, and the two people holding the casket lower it the remainder of the distance into the crypt. This method can be used for both front- and side-facing subterranean crypts. See FIG. 13.

DETAILED DESCRIPTION

Exemplary embodiments of the disclosure provide a lightweight deflating rectangular bag with a release valve for the lowering of caskets for entombment in, for example, below-floor level “Westminster” crypt locations. The exemplary embodiments are configured to lower a casket into a subterranean crypt for final entombment, while family members, relatives, and friends observe during this important moment in the funeral service in a safe, dignified, and simple manner.

Figure 1:
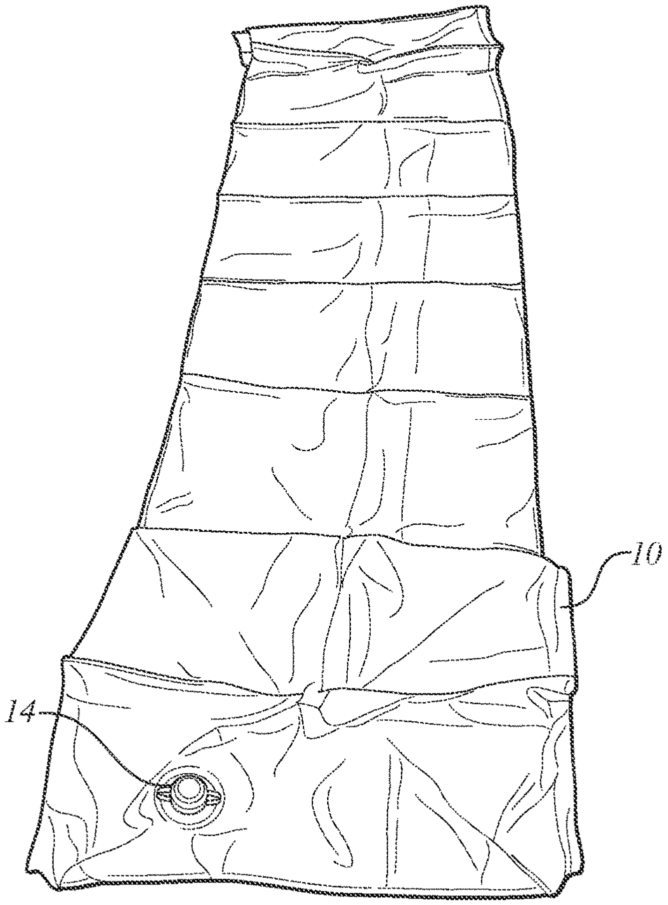
FIG. 1 shows a perspective view of a deflating bag before being inflated according to exemplary embodiments.
Figure 6:
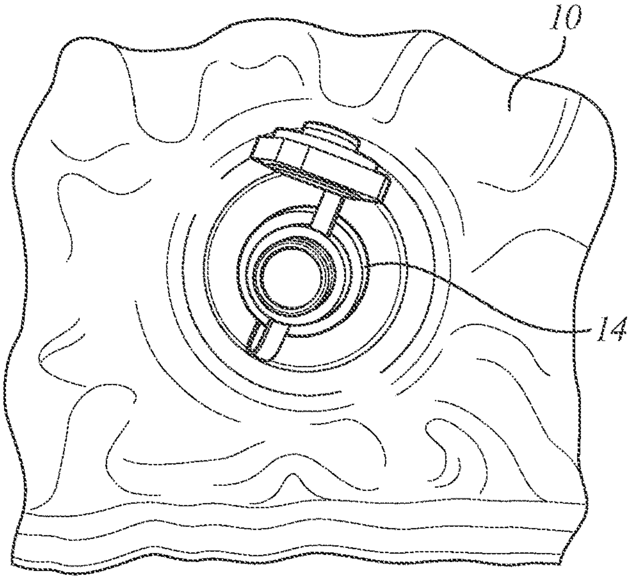
FIG. 6 shows a detail view of the plastic valve used to inflate and deflate the deflating bag.
Figure 7:
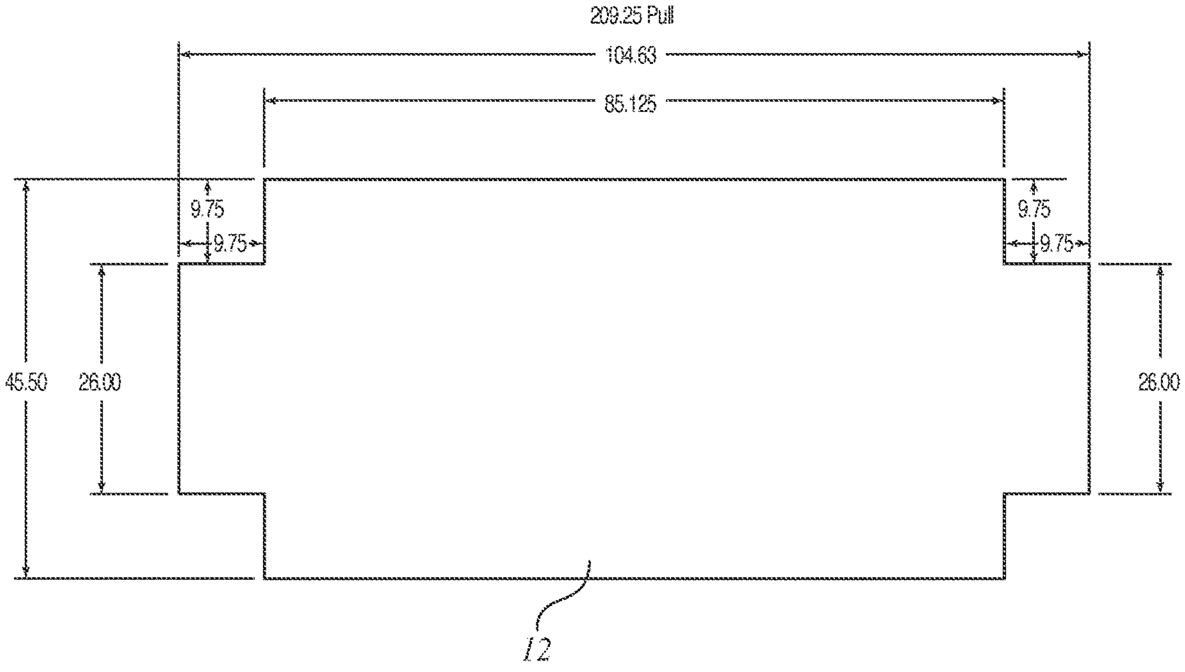
FIG. 7 is a diagram that shows the pattern used during the manufacturing process.
Figure 8:
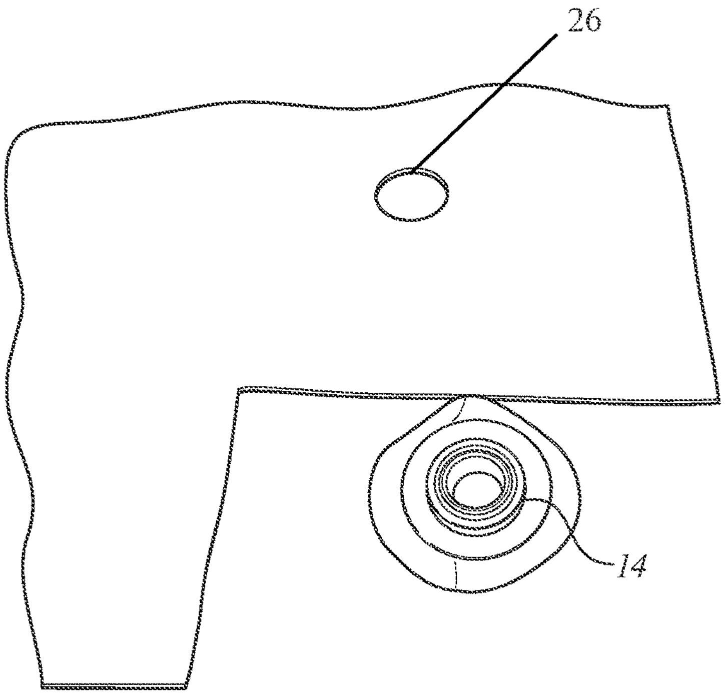
FIG. 8 is a detail view of the valve assembly during the manufacturing process.
Figure 9:
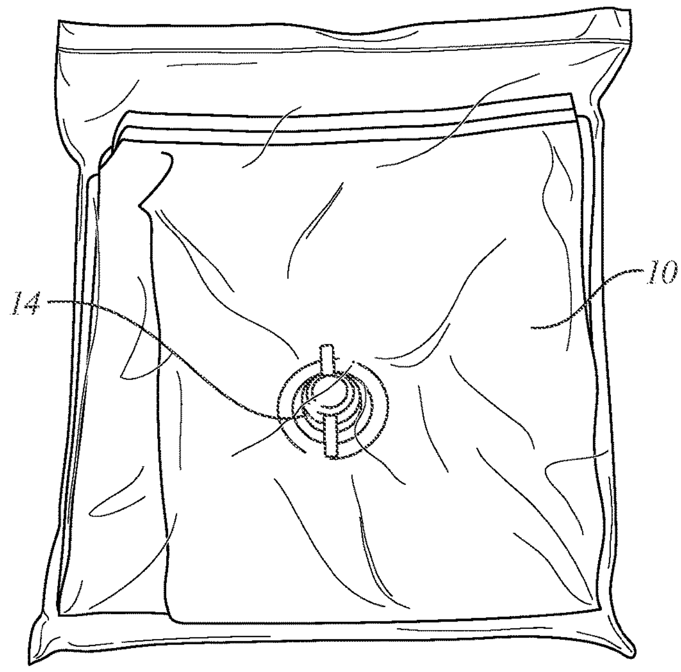
FIG. 9 shows a top view of the device compressed, folded, and packaged for shipping and storage.

As shown in FIG. 1, an exemplary embodiment is configured as a rectangular shaped deflating bag 10 with a circular two-way valve 14 depicted in FIG. 6, wherein deflating bag 10 is configured to be inflated to an inflated state and deflated to a deflated state. For assembly of deflating bag 10, mattress film 12 is cut and folded, as shown in FIG. 7, and the perimeters heat-sealed together. Deflating bag 10 may have the dimensions of 78"×23"×28", for example, forming a rectangular parallelepiped shape. In embodiments a deflating bag 10 may have dimensions of about 78"×23"×28" when inflated; as one of skill in the art will recognize that these dimensions may vary slightly depending on the extent to which one inflates a deflating bag 10, whether its overinflated or underinflated during actual use. One of skill in the art will also recognize that air expands and contracts depending on temperature such that dimensions of an inflated deflating bag 10 may vary after inflation as temperature fluctuates; nevertheless, the nominal dimensions of the bag remain substantially 78"×23"×28" when inflated. Deflating bag 10 may be made of leak and puncture resistant material such as 14.5 mil. mattress film 12. A cutout 26 is made for two-way valve 14 as shown in FIG. 8. Deflating bag 10 is compressible and foldable for shipping and storage as shown in FIG. 9.

Figure 2:
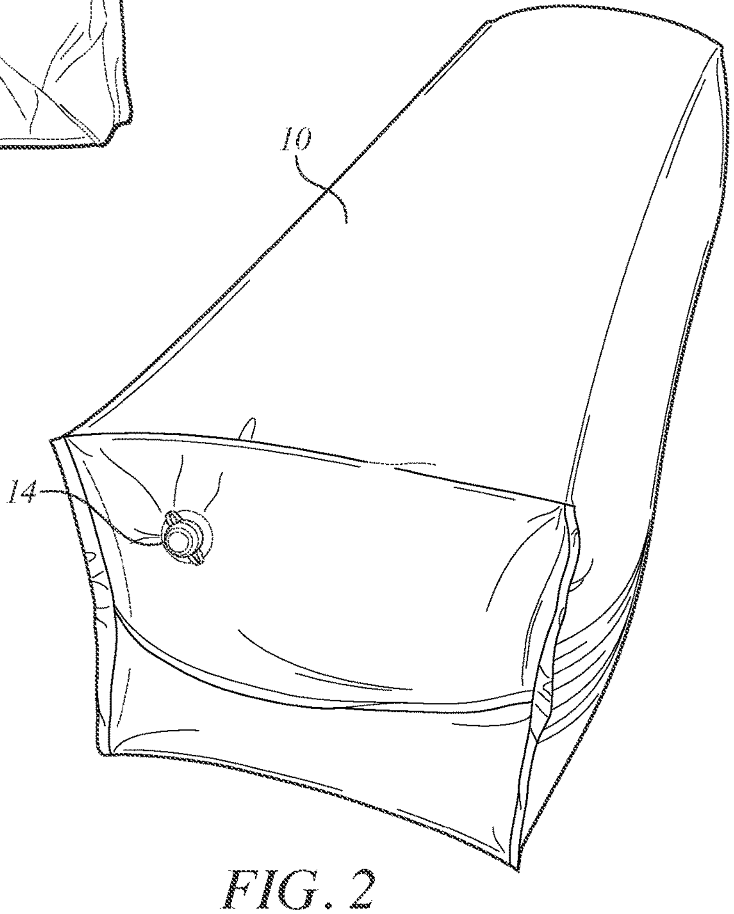
FIG. 2 shows a perspective view of the deflating bag of after being inflated to 95% capacity.
Figure 3:
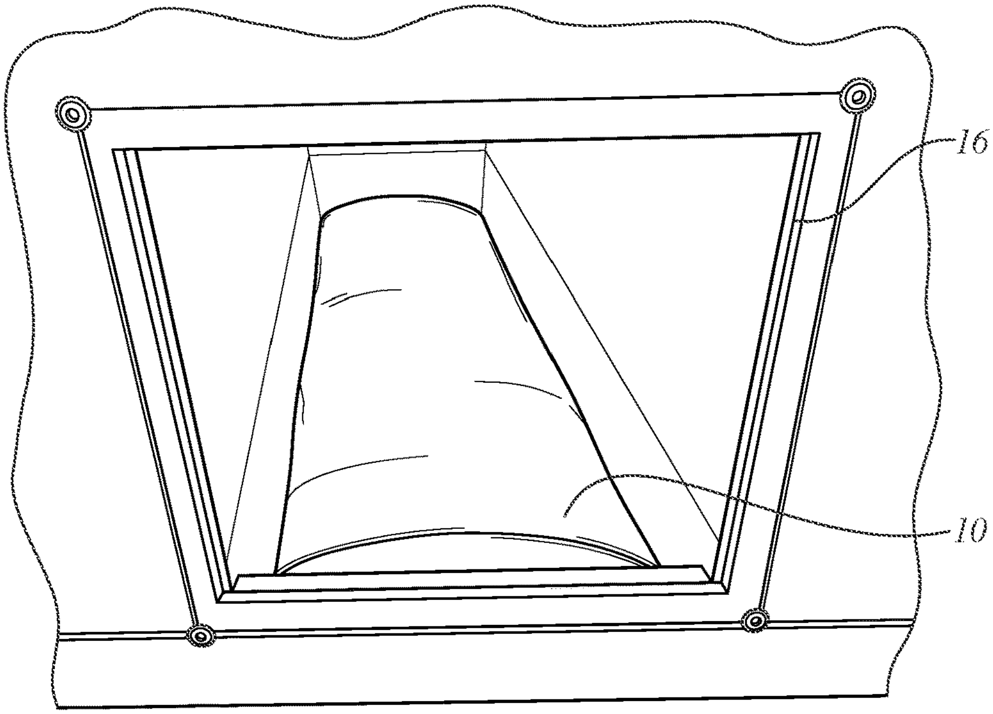
FIG. 3 shows a front view of the deflating bag placed inside the subterranean crypt chamber.
Figure 4:
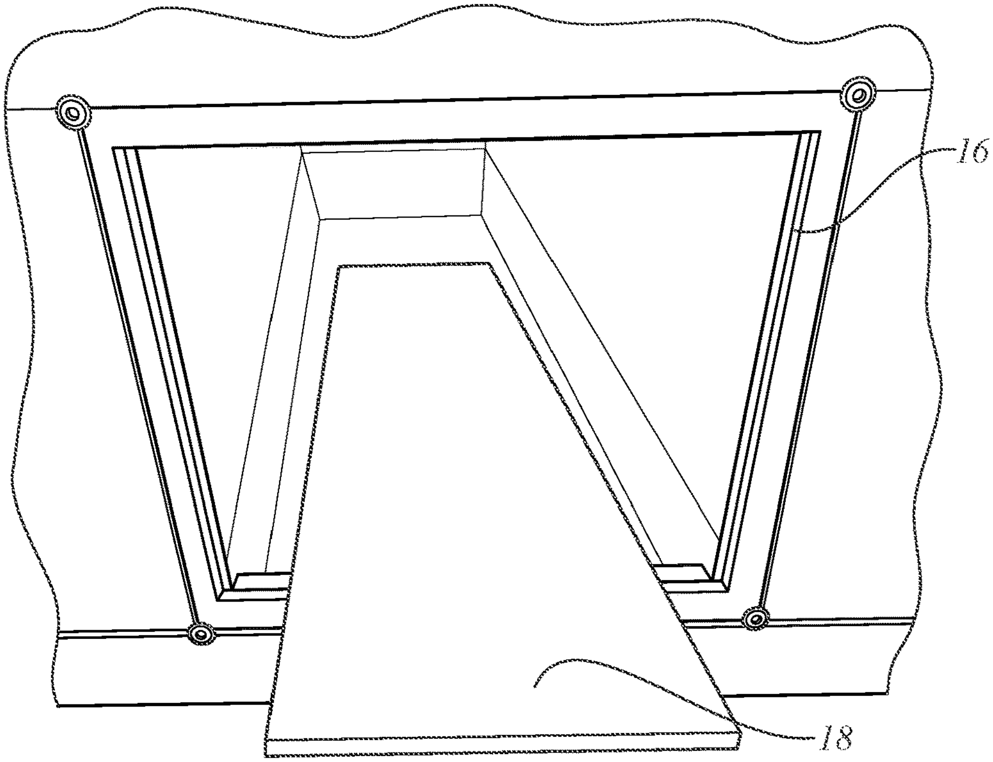
FIG. 4 shows a front view of a 22"×75" particleboard panel placed on top of the deflating bag for additional support and to facilitate the sliding of the casket completely inside the subterranean crypt chamber.
Figure 5:
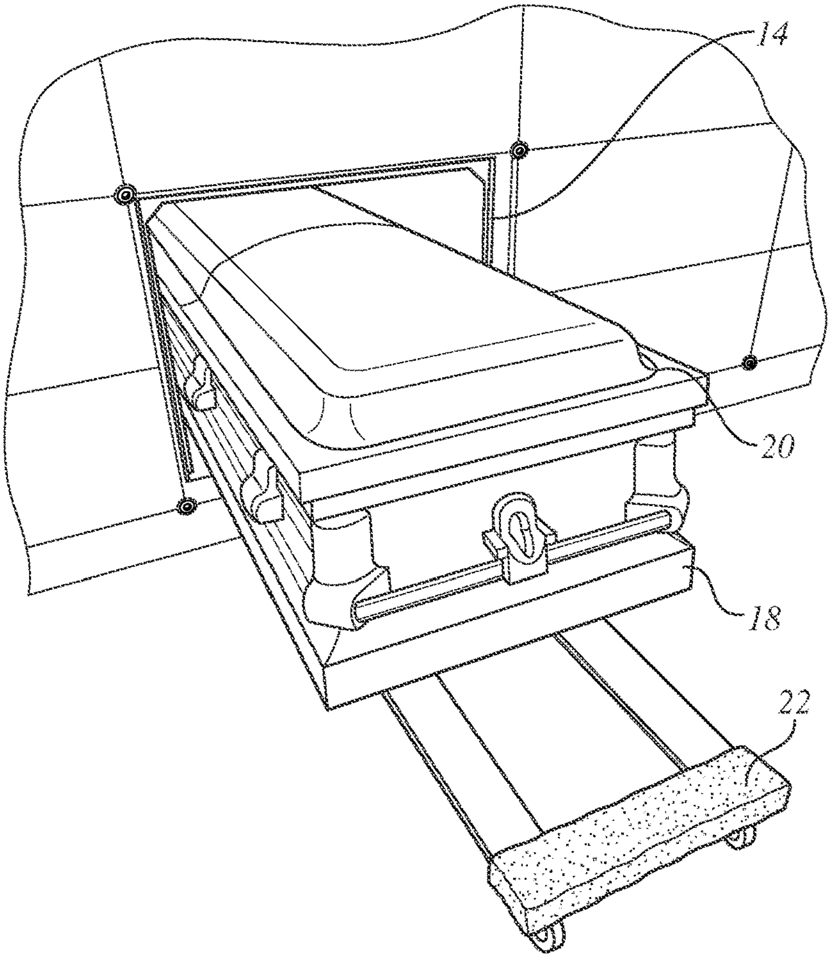
FIG. 5 shows a perspective view of the casket after having been slid partially inside the crypt chamber.

The method of lowering the casket 20 into a front-facing subterranean crypt 16 involves inflating the deflating bag 10 to 95% capacity as shown in FIG. 2 forming a substantially rectangular parallelepiped shape, placing deflating bag 10 inside the subterranean crypt 16 as shown in FIG. 3, placing a board 18 on top of the inflated deflating bag 10 as depicted in FIG. 4, placing the casket 20 on top of a furniture dolly 22, rolling the casket 20 to the front of the crypt 16 and placing the casket 20 on top of the board 18 as shown in FIG. 5 and releasing the plastic valve 14 to deflate the bag 10. Board 18 may be a 22"×75" particleboard, for example.

Figure 10:
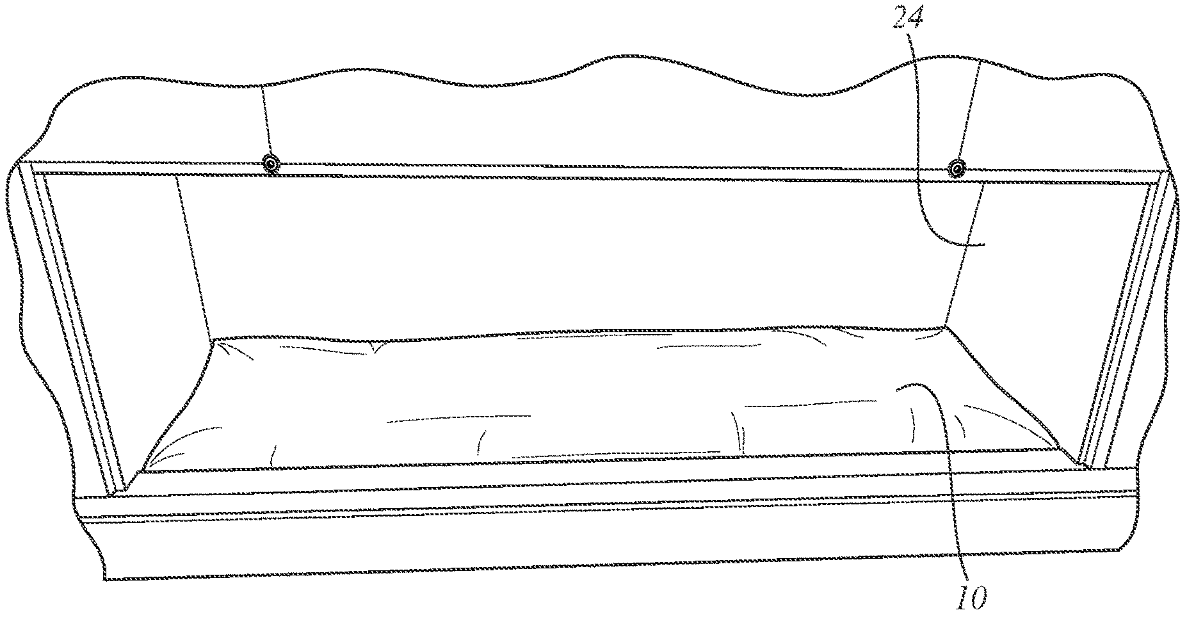
FIG. 10 shows a front view of the device inflated and rotated horizontally inside of a “couch” style subterranean crypt.
Figure 11:
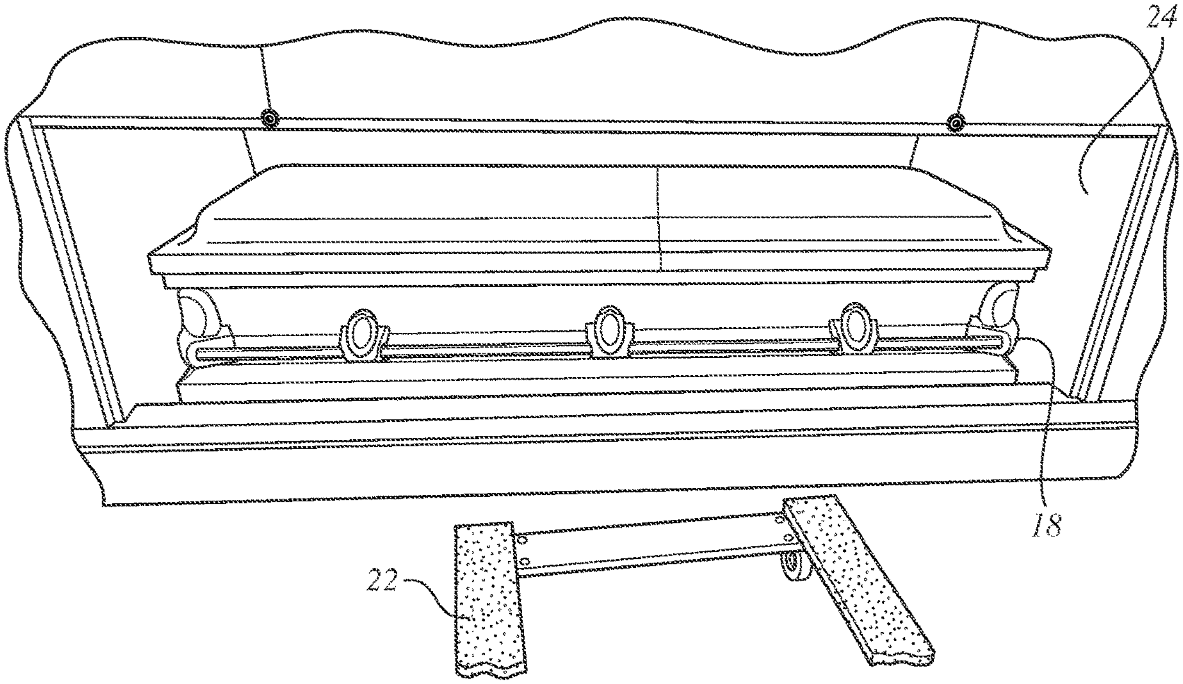
FIG. 11 shows a front view of the casket on top of the inflated device inside of a “couch” style subterranean crypt.
Figure 12A:
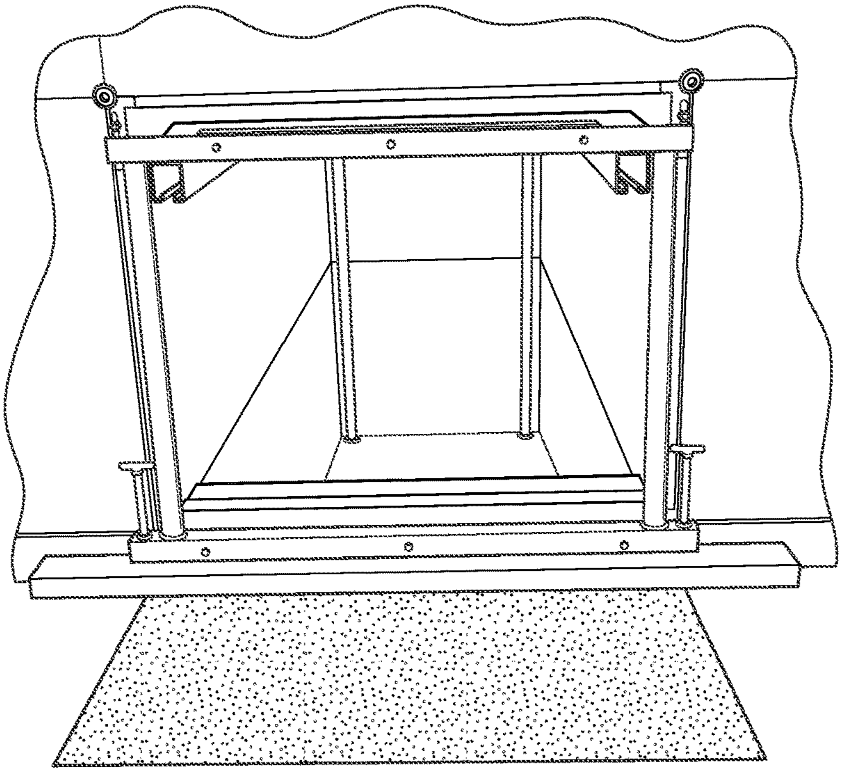
FIG. 12A (PRIOR ART)
FIGS. 12A-12C show front, front perspective and side perspective views of a first prior art method.
Figure 12B:
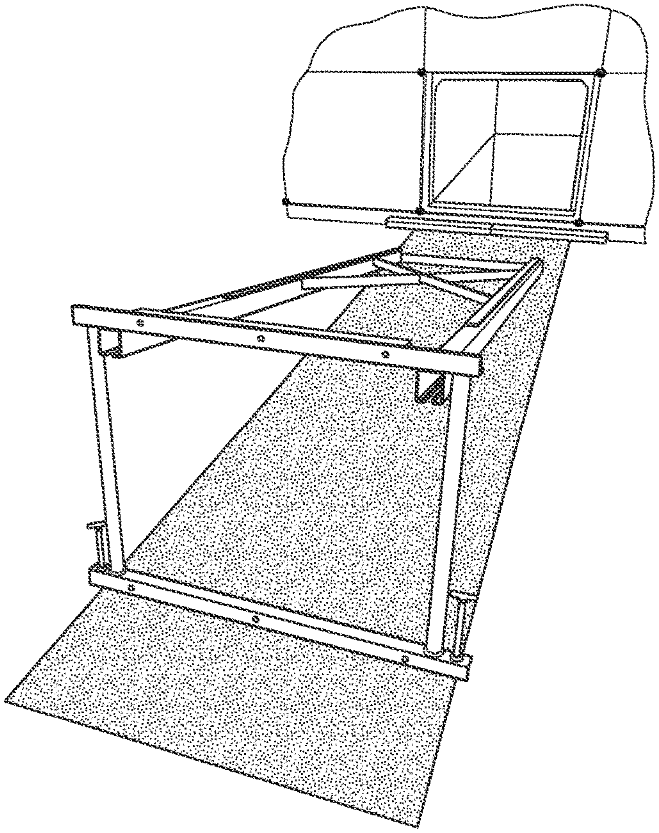
FIG. 12B (PRIOR ART)
Figure 12C:
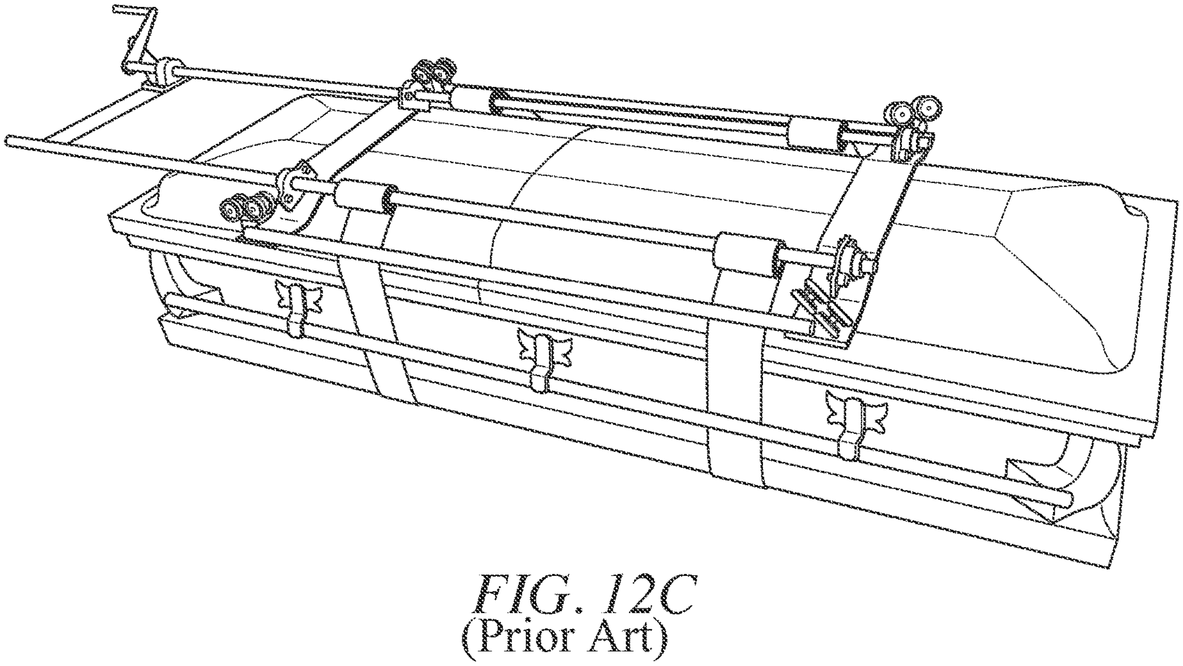
FIG. 12C (Prior Art)
Figure 13:
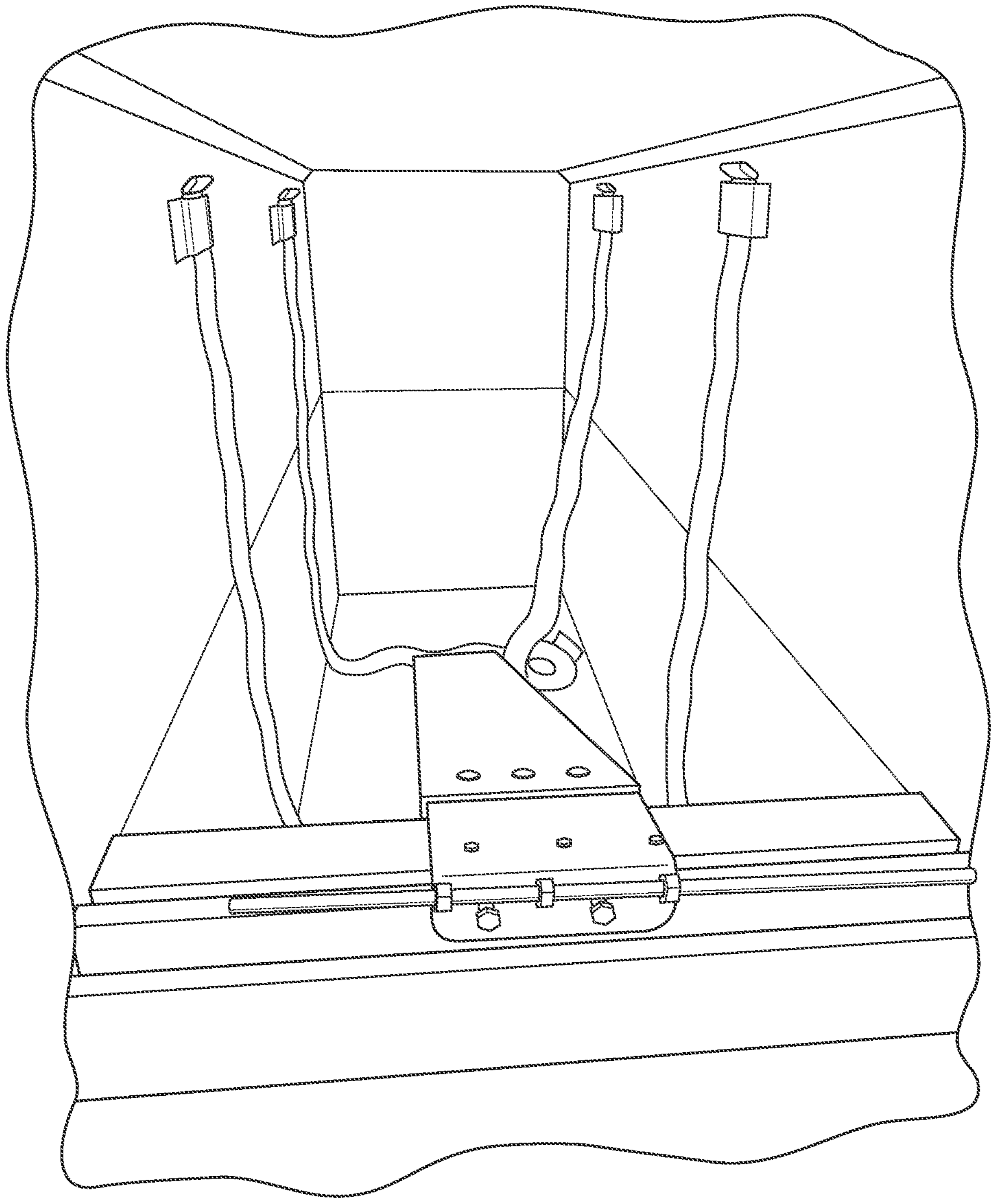
FIG. 13 (PRIOR ART)
FIG. 13 shows a front view of the second prior art method.

The method for lowering the casket 20 into a side-facing subterranean crypt 24 involves inflating deflating bag 10 to 95% capacity, placing deflating bag 10 inside the subterranean crypt 24 as shown in FIG. 10, orienting the inflated deflating bag 10 such that the plastic valve 14 is facing towards the front of the crypt 24, placing a board 18 on top of the inflated bag 10, placing the casket 20 on top of a standard furniture dolly 22, rolling the casket 20 to the front of the crypt 16 and placing the casket 20 on top of the board 18 as shown in FIG. 11 and releasing the plastic valve 14 to deflate the bag 10. Board 18 may be a 22"×75" particle-board, for example.

Exemplary embodiments require significant less man-power and improve upon the safety, dignity, and feasibility of lowering the caskets.

Nothing in the above description is meant to limit the invention to any specific materials, geometry, or orientation of elements. Many part/orientation substitutions are contemplated within the scope of the invention and will be apparent to those skilled in the art. The embodiments described herein were presented by way of example only and should not be used to limit the scope of the invention.

Although the invention has been described in terms of particular embodiments in this application, one of ordinary skill in the art, in light of the teachings herein, can generate additional embodiments and modifications without departing from the spirit of, or exceeding the scope of, the described invention. Accordingly, it is understood that the drawings and the descriptions herein are proffered only to facilitate comprehension of the invention and should not be construed to limit the scope thereof.

What is claimed is:

1. An apparatus for lowering a casket into a subterranean mausoleum crypt comprising:
- a bag formed from a leak and puncture resistant material;
- wherein the bag is configured to be inflated to an inflated state for supporting the casket within the mausoleum crypt and deflated to a deflated state for lowering the casket into a subterranean crypt chamber of the mausoleum crypt;
- wherein the bag in the inflated state has a substantially rectangular parallelepiped shape comprising a length, a width and a height, wherein the height is constant along the length and width;
- wherein the bag in the inflated state is configured to conform to the dimensions of the subterranean crypt chamber, and support the casket at the height of a top of the subterranean crypt chamber when inflated; and
- wherein an interior of the subterranean crypt chamber comprises a length, a width and a height, and wherein the width, length and height of the bag in the inflated state is configured to substantially comprise the width, length and height of the interior of the subterranean crypt chamber and further wherein the height of the bag in the inflated state is greater than the width of the bag in the inflated state, and is configured to be decreased from the inflated state by deflating the bag to the deflated state within the subterranean crypt chamber to lower the casket.

2. The apparatus of claim 1, wherein the bag comprises seams, and the seams of the bag are heat-sealed together.

3. The apparatus of claim 1, wherein the bag in the deflated state comprises a rectangular shape and is configured to be foldable for shipping and storage.

4. The apparatus of claim 3, wherein the bag in the inflated state comprises the dimensions of about 78"×23"×28" for the respective length, width, and height.

5. The apparatus of claim 4, wherein the leak and puncture resistant material comprises 14.5 mil. mattress film.

6. The apparatus of claim 5, further comprising a valve configured for inflation and deflation of the bag between the deflated state and the inflated state.

7. The apparatus of claim 6, wherein the valve is on a front face on an end of the bag and in a top half of the height of the bag in the inflated state.

8. A method of lowering a casket for final entombment into a subterranean crypt comprising:
- inflating a bag configured to support the casket within the subterranean crypt;
- placing the inflated bag inside the subterranean crypt;
- placing the casket on top of the inflated bag;
- deflating the inflated bag for lowering the casket within the subterranean crypt.

9. The method of claim 8 wherein inflating the bag comprises inflating the bag to 95% capacity.

10. The method of claim 8, prior to placing the casket on top of the inflated bag, further comprising orienting a valve of the bag to the front of the crypt.

11. The method of claim 8, prior to placing the casket on top of the inflated bag, further comprising:
- placing the casket on top of a dolly; and
- rolling the casket on the dolly to the crypt.

12. The method of claim 11, wherein the subterranean crypt is a side-facing subterranean crypt, and wherein the casket is placed on the dolly in a side-facing manner.

13. The method of claim 8, wherein the subterranean crypt is a front-facing subterranean crypt.

14. The method of claim 8, wherein the subterranean crypt is a side-facing subterranean crypt.

15. The method of claim 8, the subterranean crypt further comprising a subterranean crypt chamber, wherein the bag in the inflated state is configured to have interior dimensions of the subterranean crypt chamber.

16. The method of claim 8, wherein the bag in an inflated state comprises the dimensions of 78"×23"×28" for a respective length, width, and height.

17. The method of claim 8, wherein the bag in an inflated state comprises the dimensions of about 78"×23"×28" for a respective length, width, and height.

18. The method of claim 8, wherein the bag is comprised of a material that is leak and puncture resistant, the material comprising 14.5 mil. mattress film.

* * * * *